United States Patent [19]
Adams

[11] 3,817,054
[45] June 18, 1974

[54] AUTOMOBILE AIR CONDITIONING SYSTEM

[75] Inventor: Samuel Frank Adams, New Braunfels, Tex.

[73] Assignee: Heatransfer Corporation, San Antonio, Tex.

[22] Filed: Dec. 14, 1972

[21] Appl. No.: 315,085

[52] U.S. Cl............. 62/243, 62/244, 62/239
[51] Int. Cl............................... B60h 3/04
[58] Field of Search............. 62/243, 244, 239

[56] References Cited
UNITED STATES PATENTS

| | | | |
|---|---|---|---|
| 3,595,029 | 7/9171 | Leande | 62/243 |
| 3,597,935 | 8/1971 | Pierrat | 62/243 |
| 3,606,762 | 9/1971 | Anglin | 62/244 |
| 3,628,348 | 12/1971 | Sexon | 62/243 |

Primary Examiner—William J. Wye
Attorney, Agent, or Firm—Cox, Smith, Smith, Hale & Guenther Incorporated

[57] ABSTRACT

An air conditioning system for a rear mounted air cooled engine automobile having a compressor mounted in the engine compartment, an evaporator mounted in the passenger compartment and a condenser assembly mounted in the rear parcel compartment adjacent the engine. The condenser assembly has a condenser coil communicating with the outside atmosphere through an opening in the parcel compartment and a fan communicating with the outside atmosphere through a second opening in the parcel compartment.

7 Claims, 6 Drawing Figures

PATENTED JUN 18 1974 3,817,054

AUTOMOBILE AIR CONDITIONING SYSTEM

BACKGROUND OF THE INVENTION

This invention relates to an economical air conditioning system for automobiles of the type having air cooled engines mounted in the rear of the automobile.

Conventional water cooled automobile air conditioning systems are not suitable for use with air cooled automobile engines for obvious reasons. There is also an additional problem of finding room for the components of the air conditioning system for use in the usually compact air cooled engine automobile such as the Volkswagen. Installation of equipment for vehicles of this type has been quite complicated due to the very limited space available in the engine compartment and elsewhere. Location of the condenser assembly presents the additional problem of providing adequate outside air flow across the condensing coils. The efficiency of the condenser is increased as the exposed surface area of the coils is increased for a given c.f.m. Attempts to provide an adequate solution to the problem have included locating the condenser assembly at the front end of the automobile, adjacent the under-carriage as in U.S. Pat. No. 3,628,349. This arrangement of course exposes the condenser assembly to possible road damage from underneath the automobile and also allows debris to enter the mechanism thereby increasing maintenance cost. Another solution to the problem was provided by the arrangement disclosed in U.S. Pat. No. 3,597,935 with the condenser as well as all other components of the system, including the compressor located in the parcel compartment behind the rear seat of a "bug" type Volkswagen automobile. This system is quite expensive and requires intricate cabinet and duct design. It is also very noisy due to vibration of the compressor drive shaft arrangement. Furthermore, the exposed surface area of the condenser coils must be limited due to the lack of space which of course reduces the efficiency of the condenser. A simplification of the parcel compartment system is disclosed in U.S. Pat. No. 3,595,029, which is owned by the Assignee of my invention.

The design disclosed in U.S. Pat. No. 3,595,029 provides an ideal arrangement for flow of outside air across the condenser, however, it does require intricate air deflectors and ducting of the air through the system, adding to the cost of the system. It also suffers from the problem of limited space for the condenser thereby limiting its size. Furthermore, and particularly in some foreign countries, it is difficult to obtain many of the components for the specific assembly disclosed therein. My invention is a modification of the invention disclosed in U.S. Pat. No. 3,595,029.

SUMMARY OF THE INVENTION

It is a primary object of my invention to provide an automobile air conditioning system for use in automobiles having rear mounted air cooled engines and which provides adequate outside air flow across the condenser coil but which can be used with more conventional evaporator, fan and compressor components and which requires only slight modification to the existing structure of the automobile.

It is a further object of my invention to provide a system that is economical and readily available in foreign countries.

It is also an object of my invention to provide a condenser system that is located inside the automobile and safe from outside damage but which is capable of having a substantial coil surface area exposed to the flow of air for increased efficiency.

In accordance with the present invention, a condenser assembly including the necessary coils, valving and fan is mounted compactly in a casing which fits in and rests on the slightly modified flooring in the parcel compartment provided just behind the rear seat of many air cooled engine automobiles. For purposes of illustration, a "bug" type Volkswagen is depicted in the drawings, however, it is understood that the air conditioning system disclosed and claimed herein may be adapted for use with other types of automobiles without departing from the scope of my invention. The evaporator assembly of rather conventional design is located under the dash and is connected to the various components and source of electrical energy by means of suitable cabling. The compressor is conveniently mounted on the rear engine, and a hose cluster connects the same to the condenser and evaporator assemblies.

DESCRIPTION OF THE PREFERRED EMBODIMENT

Figure 1:
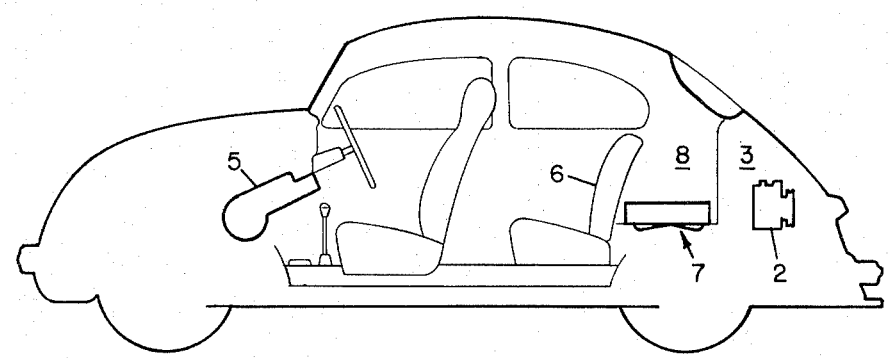
FIG. 1 is a schematic longitudinal sectional view through a "bug" type Volkswagen automobile with the invention mounted therein.

With reference to the above-described drawings, and particularly FIG. 1, a "bug" type Volkswagen automobile is shown therein and designated by reference character 1. The engine is mounted in the engine compartment 3 at the rear of the automobile with compressor 2 of the air conditioning system shown in FIG. 1 in the approximate position it occupies in the engine compartment. Also shown in FIG. 1 is the evaporator 5 mounted within the passenger compartment beneath the dashboard and the condenser assembly 7 is mounted in the parcel compartment 8 behind the rear seat 6 as will be described in more detail hereafter. All of the components of the air conditioning system are fluidly connected for circulating a refrigerant therethrough and thereby cooling the interior of the automobile by blowing inside air across the cooled evaporator coils and through outlets from the evaporator into the passenger compartment in the manner well known in the art. Likewise, power is transmitted from the crankshaft to the compressor in known manner.

Figure 2:
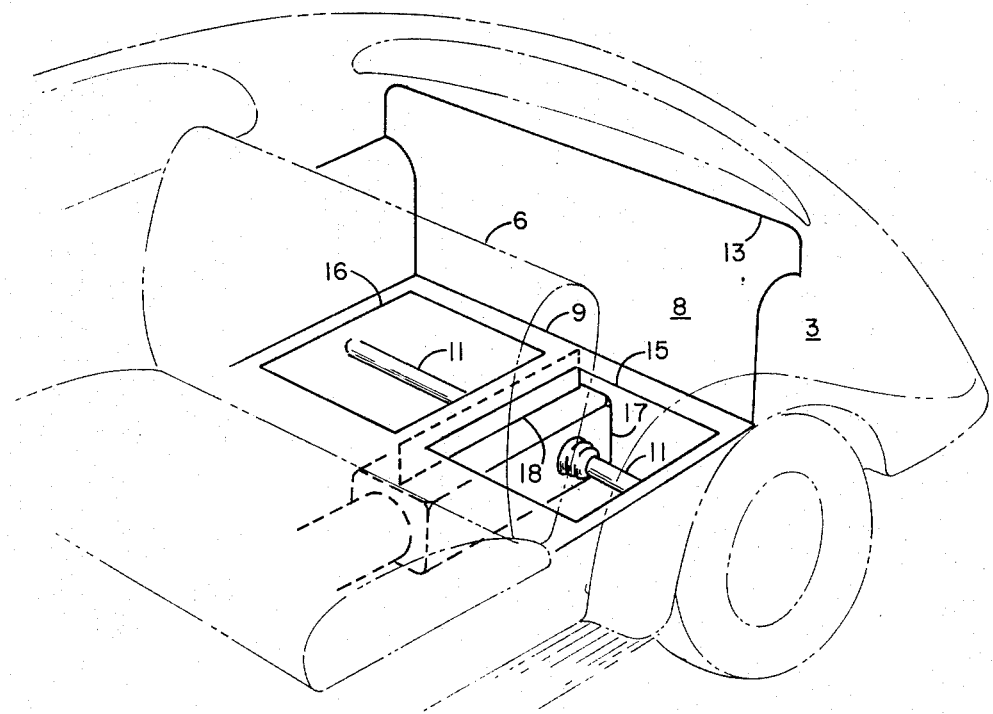
FIG. 2 is a perspective schematic view of the parcel compartment of a "bug" type Volkswagen automobile.

As shown in FIG. 2, the parcel compartment 8 is located behind the rear seat 6 and has a floor 9 separating the interior space of the automobile from the underside of the automobile above the rear axle 11. Extending upwardly from the floor 9 is the fire wall 13 separating the parcel compartment 8 from the engine compartment 3. The parcel compartment floor 9 has air intake opening 15 and air exhaust opening 16 cut therethrough. Underneath the floor 9 and extending longitudinally along the centerline of the automobile is the transmission housing 17. Connected to the floor 9 and extending downwardly to the housing 17 is an air deflector plate 18 which extends longitudinally along the housing 17 between air intake opening 15 and air exhaust opening 16 to prevent the hot exhaust air from mixing with the cool intake air.

Figure 3:
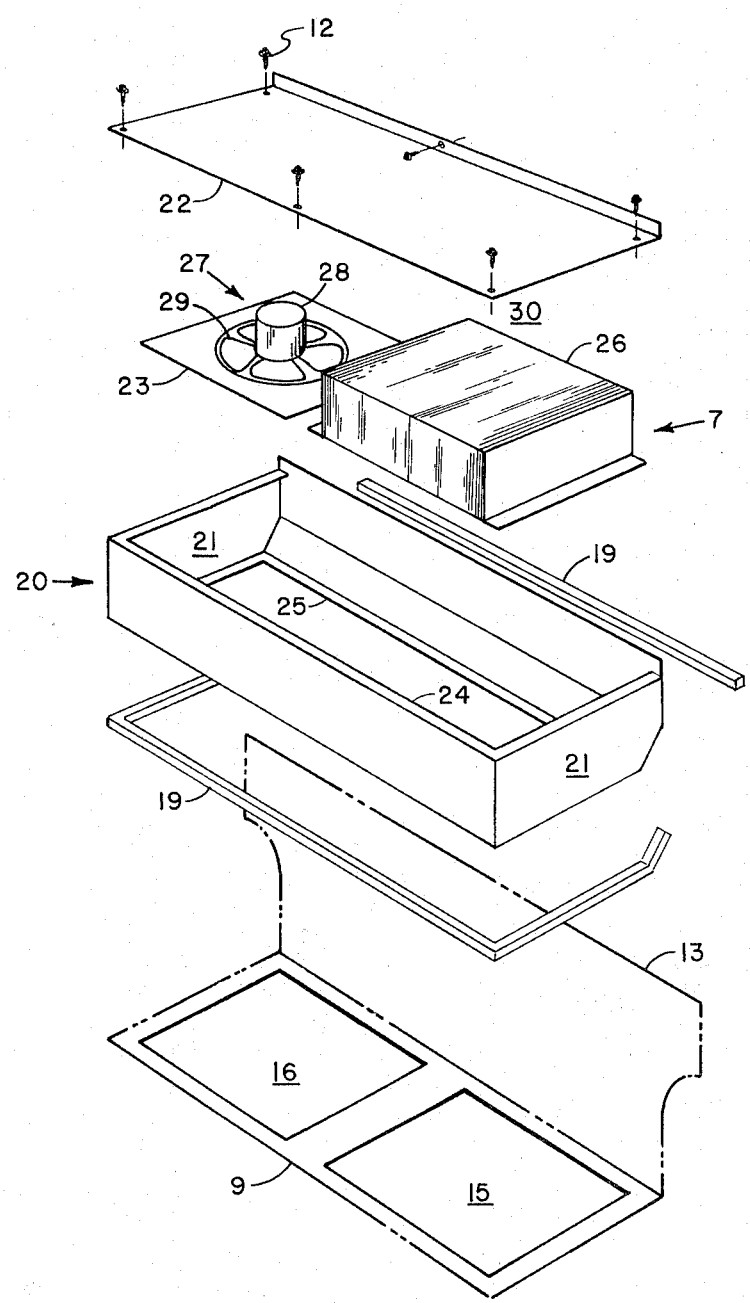
FIG. 3 is an exploded view of the preferred form of condenser assembly of this invention installed in the parcel compartment.
Figure 4:
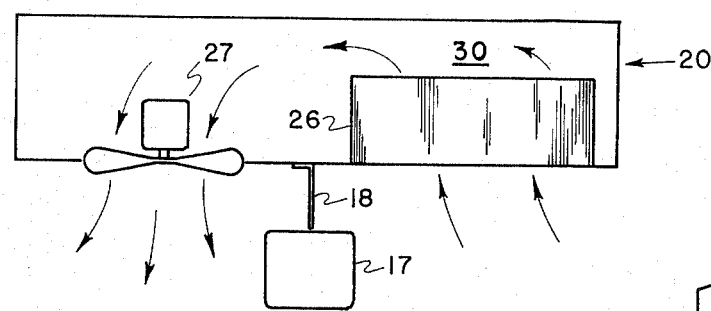
FIG. 4 is a schematic view showing the air flow through the condenser assembly in FIG. 3.

As can be seen more clearly in FIG. 3, the condenser assembly 7 is encased in a housing 20 consisting of side walls 21 with a top flange 24, a removable cover 22 and a bottom flange 25 extending inwardly from side walls 21. The cover 22 is fastened to the top flange 24 with screws 12. A condenser coil 26 is mounted within the housing 20 and rests on flange 25. A fan 27 having a motor 28, blades 29 and fan shroud 23 is mounted within the housing 20 adjacent condenser coil 26 and rests on the flange 23. The cover 22 is spaced above the coil 26 in a manner to provide an air space 30 between the coil 26 and the cover 22 for the flow of air across the top of the coil and to the fan 27. The condenser assembly is connected by suitable fastening means to the floor 9 and positioned with its condenser coil 26 and its fan 27 aligned with air intake opening 15 and air exhaust opening 16 which have been cut through the floor 9. Suitable gasket means 19 seals the assembly to the floor 9. The fan motor 28 is electrically wired to the automobile electrical system in known manner. The path of the air flow through the condenser assembly is shown schematically in FIG. 4. Since the air flow through the condenser assembly is confined within the housing 20 with no communication with the interior of the automobile, the condenser assembly can be camouflaged or used as a parcel shelf.

Figure 5:
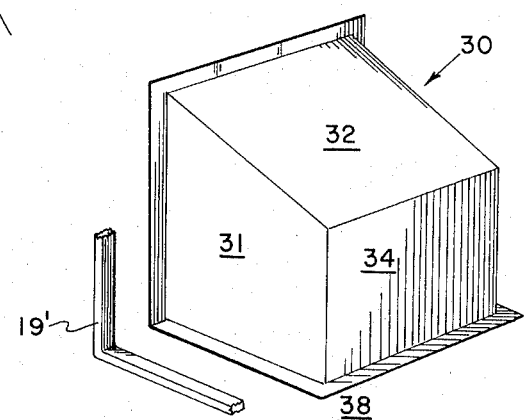
FIG. 5 is an exploded view of a modified version of the condenser assembly of this invention installed in the parcel compartment.
Figure 5:
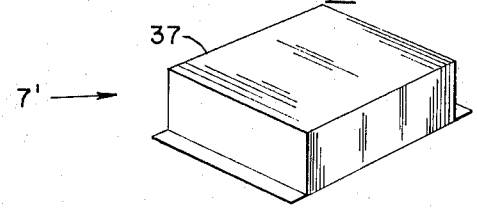
Figure 5:
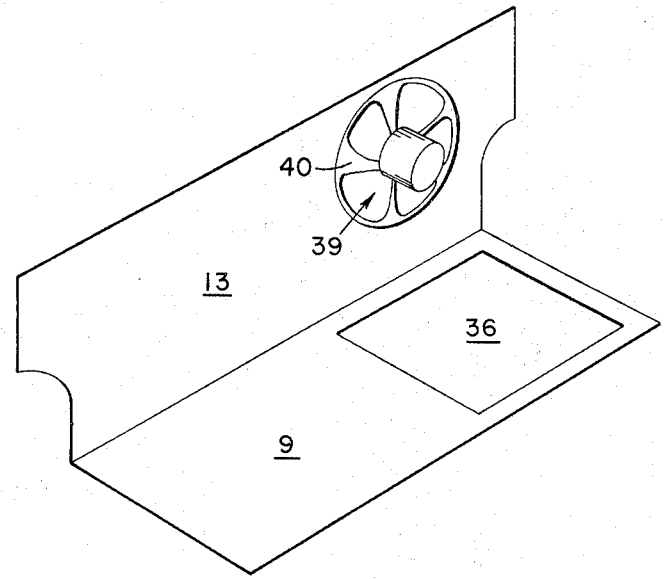
Figure 6:
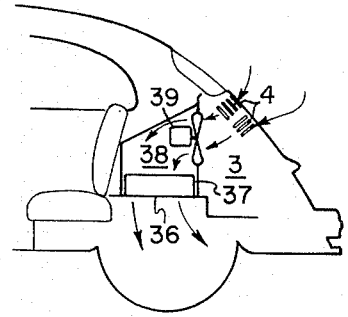
FIG. 6 is a schematic view showing the air flow through the modified condenser assembly of FIG. 5.

In FIG. 5 is shown a slightly modified version of the present invention. Like parts are denoted by like numerals as herein before described. The modified assembly is indicated generally by reference character 7' and includes a housing 30 having side walls 31, a housing cover 32 and front wall 34. Condenser coil 37 is mounted inside the housing 30 and positioned over an exhaust port 36 cut through the floor 9. The cover 32 is spaced above the condenser coil 37 to provide an air space 38. A fan 39 is connected to the back wall 35 in the space 38. The fan is positioned over an intake port 40 cut through the fire wall 13. Suitable gasket means 19' seals the assembly to the floor 9 and fire wall 13. As is shown schematically in FIG. 6, outside air is drawn into the air space 38 by fan 39 through the louvers 4 in engine compartment 3. Fan 39 then forces the air into air space 38 and through the condenser coil 37 and exhausts it through the exhaust port 36 in the floor 9. This modification eliminates the need for the air deflector plate 18 and provides additional economy in certain types of rear engine automobiles.

Having now described the preferred embodiment of my invention what I claim is:

1. In an automobile having a rear air cooled engine compartment, a passenger compartment, a parcel compartment rearwardly of said passenger compartment, said parcel compartment having a floor separating it from the underside of the automobile, said floor being spaced above the transmission housing, and a vertical fire wall separating the parcel compartment from the engine compartment; an air conditioning system including a compressor mounted in said engine compartment, an evaporator mounted in said passenger compartment and a condenser assembly mounted on said floor in said parcel compartment, said parcel compartment having first and second openings communicating with the outside of said automobile, said condenser assembly including a condenser coil positioned over said first opening, a fan mounted over said second opening and a closed air space for circulating air from said first opening to said second opening.

2. The system of claim 1 wherein said first and second openings are through said floor.

3. The system of claim 2 wherein said condenser assembly includes a housing having a cover and side walls with an inwardly extending bottom flange, said condenser coil and said fan are positioned in adjacent relationship and rest on said flange.

4. The system of claim 3 wherein said cover is spaced above the condenser coil to provide said closed air space.

5. The system of claim 4 wherein said first and second openings are positioned above and on opposite sides of the transmission housing and an air deflector plate is connected to said floor between said first and second openings and extends downwardly to said transmission housing.

6. The assembly of claim 1 wherein said first opening is in said fire wall and said second opening is in said floor.

7. The assembly of claim 6 wherein said condenser assembly includes a housing mounted on said floor, said housing having a front wall, side walls and a cover said cover being spaced above the condenser coil to provide said closed air space.

* * * * *